(12) United States Patent
Nagabhushan et al.

(10) Patent No.: US 8,876,060 B2
(45) Date of Patent: Nov. 4, 2014

(54) SPLIT FLYWHEEL ASSEMBLY WITH ATTITUDE JITTER MINIMIZATION

(75) Inventors: Vivek Nagabhushan, Phoenix, AZ (US); Norman G. Fitz-Coy, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 101 days.

(21) Appl. No.: 13/499,032

(22) PCT Filed: Sep. 30, 2010

(86) PCT No.: PCT/US2010/050854
§ 371 (c)(1),
(2), (4) Date: May 30, 2012

(87) PCT Pub. No.: WO2011/041503
PCT Pub. Date: Apr. 7, 2011

(65) Prior Publication Data
US 2012/0234981 A1    Sep. 20, 2012

Related U.S. Application Data

(60) Provisional application No. 61/247,717, filed on Oct. 1, 2009.

(51) Int. Cl.
*B64G 1/28* (2006.01)
*G05D 1/08* (2006.01)
*F16F 15/30* (2006.01)

(52) U.S. Cl.
CPC ............... *G05D 1/0808* (2013.01); *B64G 1/28* (2013.01); *F16F 15/30* (2013.01)

USPC ..................... 244/165; 244/164; 290/1 R

(58) Field of Classification Search
USPC ............. 244/165, 164; 192/90, 84.9–84.961; 290/1 R
See application file for complete search history.

(56) References Cited

U.S. PATENT DOCUMENTS 2,315,298 A * 3/1943 Thompson ............... 192/18 B
2,644,427 A * 7/1953 Sedgfield et al. ......... 91/363 R
(Continued)

FOREIGN PATENT DOCUMENTS

JP   58-215948 A   12/1983
JP   60-94893 B2   11/1994
(Continued)

OTHER PUBLICATIONS

Varatharajoo, Renuganth, et al.; "Methodology for the development of combined energy and attitude control systems for satellites"; Aerospace Science and Technology, vol. 6, Issue 4, Jun. 2002, pp. 303-311.

(Continued)

*Primary Examiner* — Christopher P Ellis
*Assistant Examiner* — Medhat Badawi
(74) *Attorney, Agent, or Firm* — Alston & Bird LLP

(57) ABSTRACT

Various embodiments of the present invention include assemblies and methods for minimizing the amplitude of attitude jitter. In one embodiment, a split flywheel assembly includes a plurality of independent concentric flywheels axially aligned and in operable engagement with one another such that each flywheel is configured to be independently controlled in order to manipulate the phase difference therebetween.

19 Claims, 9 Drawing Sheets

(56) References Cited

U.S. PATENT DOCUMENTS

| | | | |
|---|---|---|---|
| 4,723,735 A | | 2/1988 | Eisenhaure et al. |
| 4,732,353 A | | 3/1988 | Studer |
| 5,025,680 A | | 6/1991 | Umeyama et al. |
| 5,256,942 A | * | 10/1993 | Wood .......................... 318/649 |
| 5,315,158 A | * | 5/1994 | Danielson .................... 290/1 R |
| 5,848,938 A | * | 12/1998 | Curtis et al. ............... 464/68.41 |
| 6,041,678 A | | 3/2000 | Cooke et al. |
| 6,062,103 A | * | 5/2000 | Soares et al. ................. 464/68.4 |
| 6,113,033 A | | 9/2000 | Parks et al. |
| 6,568,634 B2 | * | 5/2003 | Smith ............................ 244/72 |
| 6,648,274 B1 | * | 11/2003 | Bailey et al. .................. 244/165 |
| 2004/0164960 A1 | * | 8/2004 | Jacobus et al. ................ 345/161 |
| 2006/0086865 A1 | * | 4/2006 | Jacobs et al. .................. 244/165 |
| 2008/0105787 A1 | * | 5/2008 | Hamilton et al. ............. 244/165 |
| 2010/0038473 A1 | * | 2/2010 | Schneider et al. .............. 244/60 |
| 2010/0072847 A1 | | 3/2010 | Fields et al. |
| 2010/0117375 A1 | * | 5/2010 | Kwok ........................... 290/1 R |
| 2011/0006162 A1 | * | 1/2011 | Sperandei ..................... 244/165 |
| 2011/0011982 A1 | * | 1/2011 | Herman et al. ............... 244/165 |
| 2011/0168848 A1 | * | 7/2011 | Ih et al. ........................ 244/165 |
| 2012/0199697 A1 | * | 8/2012 | Nagabhushan et al. ...... 244/165 |

FOREIGN PATENT DOCUMENTS

| | | |
|---|---|---|
| JP | 2004-044718 A | 2/2004 |
| WO | WO 2010/135421 A2 | 11/2010 |
| WO | WO 2011/041503 A2 | 4/2011 |

OTHER PUBLICATIONS

Varatharajoo, Renuganth, et al.; "The combined energy and attitude control system for small satellites—Earth observation missions"; Acta Astronautica, vol. 56, Issues 1-2, Jan. 2005, pp. 251-259.

Kenny, B.H.; "Demonstration of Single Axis Combined attitude control and energy storage using two flywheels"; Aerospace Conference, 2004; IEEE; Mar. 13, 2004.

Shiue, Fuh-Wen, et al.; "Condition Monitoring of Filament-Wound Composite Flywheels Having Circumferential Cracks"; Journal of Spacecraft and Rockets; vol. 39, No. 2, Mar.-Apr. 2002, pp. 306-313.

Pilinski, Emily B., et al.; "Pointing-Stability Performance of the Cassini Spacecraft"; Journal of Spacecraft and Rockets; vol. 46, No. 5, Sep.-Oct. 2009; pp. 1007-1015.

Algrain, Marcelo C.; "High-Bandwidth Attitude Jitter Determination for Pointing and Tracking Systems"; Society of Photo-Optical Instrumentation Engineers; 36(7); Jul. 1997; pp. 2092-2100.

McIntyre, J.E., et al.; "Bearing Axis Wobble for a Dual Spin Vehicle"; Closed-Loop Dynamics of a Dual-Spin Spacecraft; Sep. 1971; pp. 945-951.

International Search Report and Written Opinion from International Application No. PCT/US2010/050854, dated Apr. 15, 2011.

\* cited by examiner

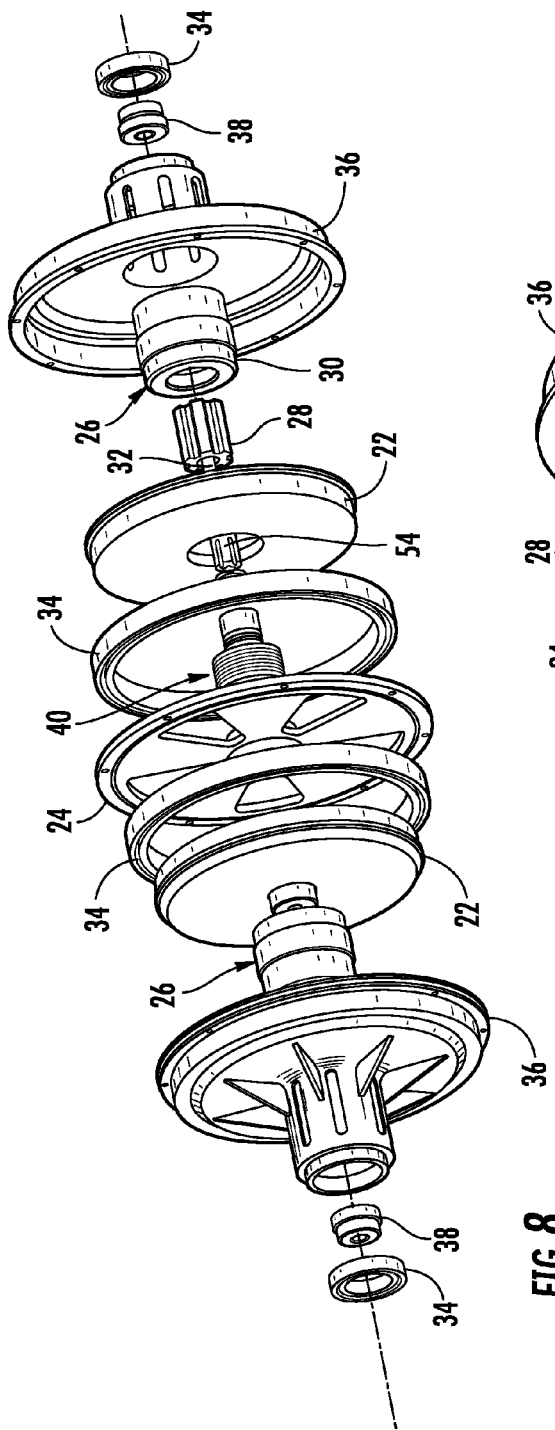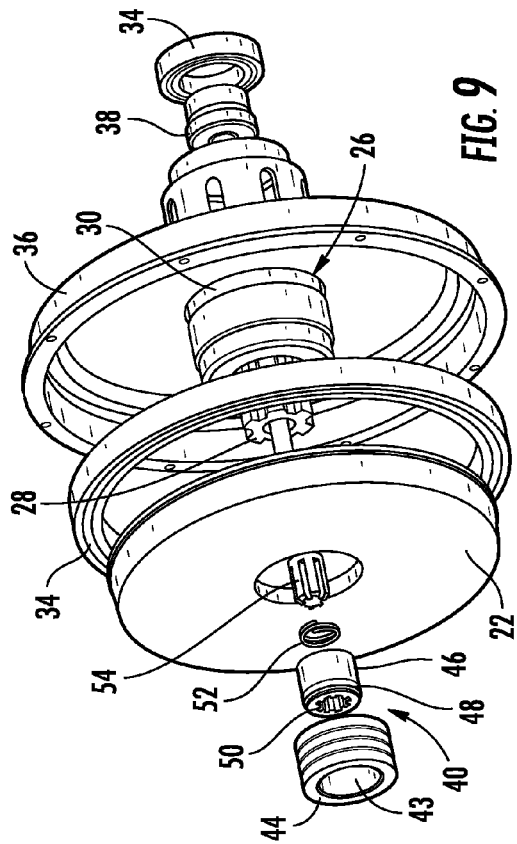
FIG. 8
FIG. 9

SPLIT FLYWHEEL ASSEMBLY WITH ATTITUDE JITTER MINIMIZATION

CROSS REFERENCE TO RELATED APPLICATIONS

This application is a national stage application filed under 35 U.S.C. 371 of International Application No. PCT/US2010/050854, filed Sep. 30, 2010, claiming priority to U.S. Provisional Application No. 61/247,717, filed Oct. 1, 2009, each of which is incorporated by reference herein in its entirety.

FIELD OF THE INVENTION

Embodiments of the present invention relate to satellites and, more particularly, to a flywheel assembly for minimizing the amplitude of attitude jitter in satellites.

BACKGROUND

Small satellites are evolving rapidly to augment the functions of larger satellites as well as individually perform some of the tasks such as stereo-imaging and directional communication which were earlier possible only by their larger counterparts. This evolution is gaining ground as attitude control actuators are being developed for smaller classes of satellites. Actuators based on the principle of momentum exchange like reaction wheels, momentum wheels and control moment gyroscopes (CMGs) have multiple spinning wheels or flywheels. The CMG is one such actuator that enables rapid retargeting and precision pointing which are necessary for applications mentioned above. The CMG has flywheels mounted on gimbals which when actuated produces gyroscopic torque that is the control input for the attitude control system (ACS). A large amount of momentum must be stored in these flywheels to be able to produce torques large enough to achieve rapid retargeting. A single flywheel system consists of a uniform flywheel supported by bearings and spun by a brushless DC motor and housed in a sealed casing. A single flywheel assembly 10 in its most basic form is shown in FIG. 1. This system could be used as a reaction wheel or as the flywheel for a CMG.

One of the obvious problems with a flywheel spinning at high speeds is that of imbalance and its effect on the attitude of the satellite. The imbalance introduces a high frequency jitter (equivalent to the angular speed of the flywheel). This drawback is more pronounced in smaller satellites and the task of attitude control of these satellites becomes more challenging; due to their low inertia the satellites are more sensitive to attitude disturbances [2], be it external (e.g., solar winds) or internal (e.g., due to imbalance in flywheel). The high frequency jitter affects imaging systems [3], pointing antennas, and line of sight type instruments and could also excite some of the flexible structures like solar arrays. Usually the external disturbances are non-periodic, of varying magnitude and very low frequency and attitude changes can be corrected using an attitude control system. The effect of attitude jitter on imaging systems have been previously addressed using compensation techniques/mechanisms on the instrument itself (mounting the instrument on additional gimbals for isolation), software techniques, and digital image processing.

The amplitude of the jitter can be minimized by balancing the flywheel, but over a period of time this may be ineffective as the eccentricity may change due to wear in bearings and thermal or structural distortion of the flywheel or the mount [4]. This motivates a need for an onboard real-time jitter compensation technique which can reduce the amplitude of attitude jitter for the lifetime of the satellite. Attitude control systems are critical to the functionality of the satellite and the loss of attitude control due to flywheel failures can render the satellite useless. Flywheel failures can be attributed to bearing damage and motor failures. Having redundancy in the system, without adding significant mass or increasing the complexity of the system may increase the reliability of the system.

Consider a satellite with a single flywheel spinning at an angular velocity $\underline{\omega}$ about its geometric center. The eccentricity due to the location of the center of mass not coinciding with the geometric center causes imbalance in rotation which imparts a force on the satellite through the mounts causing the satellite to rotate about its center of mass [5]. The direction of the imbalance force varies periodically with a frequency equivalent to the rotational speed $\underline{\omega}$ and the magnitude is proportional to both the magnitude of eccentricity and the rotational velocity. This fluctuating imbalance force causes jitter in the attitude of the satellite. The eccentricity could be due to errors in manufacturing processes like non-homogeneity of the material of the flywheel, machining imperfections, bearing clearances and misalignments, and assembly imperfections [5]. These errors can be minimized by balancing the flywheel assembly before installation on the spacecraft although the errors cannot be eliminated due to instruments and equipment limitations. The eccentricity could also develop over a period of time due to thermal distortion, bearing wear and structural deformation of flywheel, bearings, and structures due to their finite stiffness [4]. In such a case the eccentricity cannot be predicted and requires an onboard correction mechanism to compensate for the imbalance.

Various mechanisms have been used to compensate for attitude jitter. Some of them include signal processing techniques, isolation mechanisms for instruments (such as a double gimbaled mount), and use of dampers to minimize the magnitude of jitter. The first technique is instrument dependant and is based on estimation and filtering that may still include noise and erroneous data. The second technique is expensive and requires additional hardware with complex control. Dampers reduce the magnitude of jitter but still leave some residual jitter corresponding to the minimum energy state of the system. Dampers also require additional space on the spacecraft and stowage of viscous damping liquid.

Therefore, there exists a need for a flywheel assembly for minimizing the amplitude of attitude jitter in satellites. It would be further advantageous to provide such a flywheel assembly that is redundant for increasing reliability.

BRIEF SUMMARY OF THE INVENTION

Various embodiments of the present invention include a split flywheel design that minimizes the amplitude of attitude jitter in satellites, and in some embodiments, adds redundancy. According to various embodiments, the split flywheel design allows manipulation of the phase difference between two or more flywheels spinning at substantially the same angular velocity to negate each other's imbalance (due to eccentricity in their centers of mass). In certain embodiments, the split flywheel design includes two or more separate flywheels in place of one flywheel, and the flywheels are mounted such that they are substantially concentric and axially (e.g., axially) aligned. In addition, in certain embodiments, the flywheel design includes a coupling apparatus adapted to selectively couple the flywheels together. In one particular embodiment, the flywheels are substantially geometrically identical and may be mounted substantially symmetrically on a central yoke. Each flywheel may be spun (or capable of being spun) using a separate motor at a desired speed.

In one embodiment, the flywheels are configured so that their overall mass and inertia is less than about 15% greater than the overall mass and inertia of a single flywheel assembly capable of being used in an identical satellite. According to one aspect, the mass and inertia of the flywheels are substantially equivalent (e.g., equivalent) to the mass and inertia of a single flywheel that may be used in a particular application. In addition, in one embodiment, the motors used are frameless, brushless DC motors, which may allow the use of a common housing for mounting the motor and the flywheel. This may save considerable amounts of mass and volume.

According to various embodiments, in operation, the flywheels are at most times coupled together by a clutch (e.g., an electromagnetic friction clutch). However, when one of the flywheels is controlled to alter the phase difference between the flywheels to minimize jitter or imbalance, the clutch may be released to uncouple the flywheels. To control the phase difference, the motors spin the flywheels separately at a substantially equal speed, and then the speed of one of the flywheels is incremented and/or decremented (to alter the phase difference) until the jitter is minimized. After the phase has been altered, the clutch is engaged again, and one of the motors may be turned off. In one aspect, a controller is employed to control the clutch so as to engage and disengage the clutch such that the flywheels are coupled and decoupled to one another, respectively, to obtain a desired phase difference.

In one embodiment, a split flywheel assembly for minimizing the amplitude of attitude jitter is provided. The split flywheel assembly includes a plurality of independent concentric flywheels axially aligned and in operable engagement with one another such that each flywheel is configured to be independently controlled in order to manipulate the phase difference therebetween. For example, a pair of independent flywheels may be in operable engagement with one another. A clutch may be used to selectively engage and disengage the flywheels such that the flywheels are configured to spin concurrently or independently of one another in the engaged or disengaged positions, respectively, in order to obtain a desired phase difference. In one application, the assembly is configured to be mounted within a satellite such that the satellite can be rebalanced by independently controlling the speed of rotation of at least one of the flywheels to adjust the phase difference therebetween.

According to another embodiment, a method for minimizing the amplitude of attitude jitter is provided. In particular, the method includes providing a plurality of independent concentric flywheels axially aligned and in operable engagement with one another and independently controlling each flywheel so as to manipulate the phase difference therebetween. The controlling step may include selectively engaging and disengaging the flywheels such the flywheels are configured to spin concurrently or independently of one another in the engaged or disengaged positions, respectively. In one aspect, the controlling step includes independently controlling the speed of rotation of at least one of the flywheels to adjust the phase difference therebetween. Moreover, the controlling step may include incrementing and decrementing the speed of rotation of at least one of the flywheels (e.g., providing one or more trapezoidal velocity commands). The method may further include spinning the flywheels with respective motors at substantially the same speed at a desired phase difference. Furthermore, the method may include stopping rotation of one of the motors and spinning the flywheels concurrently with a single motor. According to one aspect, stopping rotation of one of the motors and spinning the flywheels concurrently occurs simultaneously.

BRIEF DESCRIPTION OF THE DRAWINGS

Reference will now be made to the accompanying drawings, which are not necessarily drawn to scale, and wherein:

FIGS. 8 and 9 depict exploded perspective views of a split flywheel assembly according to an embodiment of the present invention;

DETAILED DESCRIPTION OF VARIOUS EMBODIMENTS OF THE INVENTION

Various embodiments of the present invention will now be described more fully hereinafter with reference to the accompanying figures, in which some, but not all embodiments of the inventions are shown. Indeed, these inventions may be embodied in many different forms and should not be construed as limited to the embodiments set forth herein. Rather, these embodiments are provided so that this disclosure will satisfy applicable legal requirements. Like numbers refer to like elements throughout.

Figure 3:
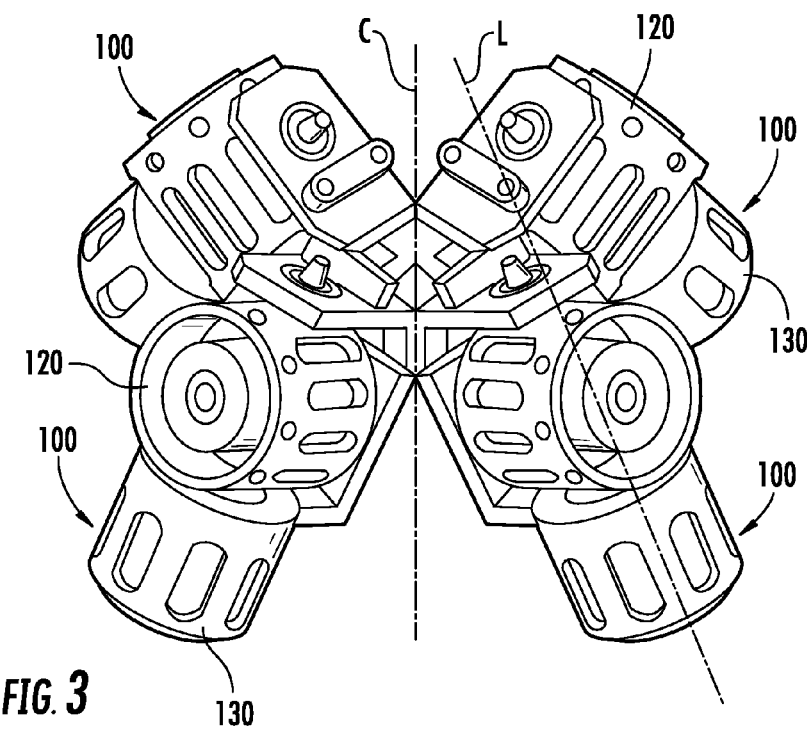
FIG. 3 illustrates an assembly of CMGs according to one embodiment of the present invention.
Figure 4:
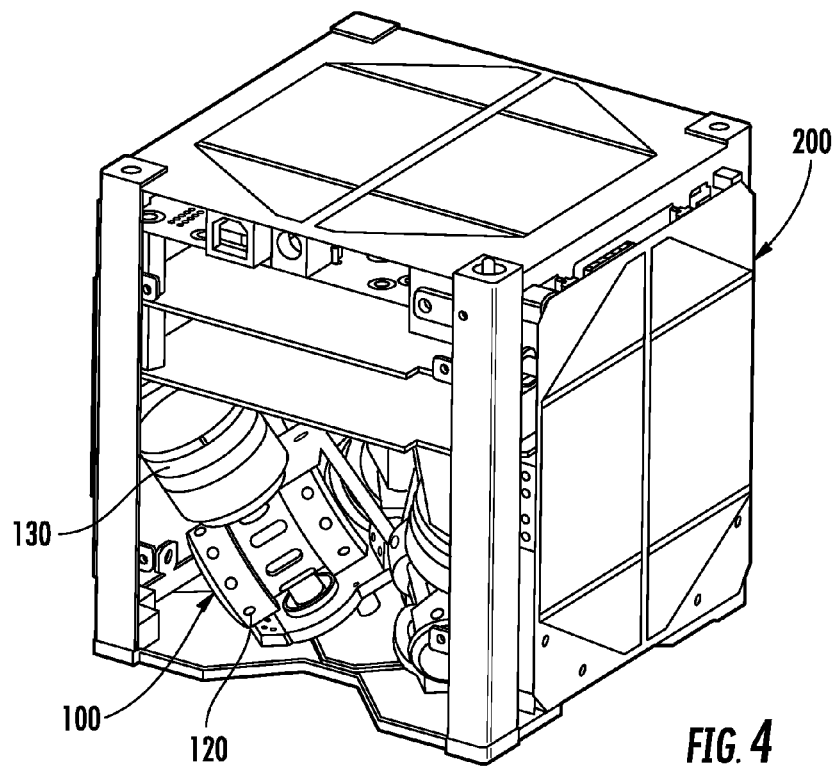
FIG. 4 illustrates a small satellite according to one embodiment of the present invention.

Embodiments of the present invention are directed to a flywheel assembly 10 that adds redundancy for increased reliability and reduces the amplitude of jitter by manipulating the phase difference using controlled balancing techniques. In general, the flywheel assembly 10 utilizes two flywheels 12 driven by separate motors 14, where the eccentricity ($e_1$) in one flywheel is balanced by the eccentricity ($e_2$) in the other. The flywheel assembly 10 could be used in connection with one or more CMGs 100 (see FIG. 3), wherein each CMG includes a flywheel assembly 120 in operable engagement with a gimbal assembly 130 for generating a desired torque. In one aspect, the flywheel assembly 120 and gimbal assembly 130 may be used with a satellite 200 as shown in FIG. 4 (e.g., a pico- or nano-satellite). A plurality of CMGs 100 may be coupled together in various configurations (e.g., pyramidal as shown in FIGS. 3 and 4 for use with a satellite). For more details regarding exemplary CMGs and associated satellites, please see International Application No. PCT/US2010/035397, entitled Attitude Control System for Small Satellites, filed on May 19, 2010, which is incorporated by reference in its entirety herein.

Split Flywheel Assembly

Figure 1:
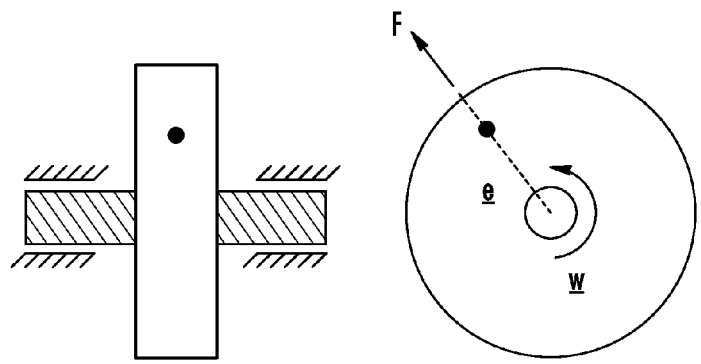
FIG. 1 illustrates a schematic of a conventional flywheel.
Figure 2:
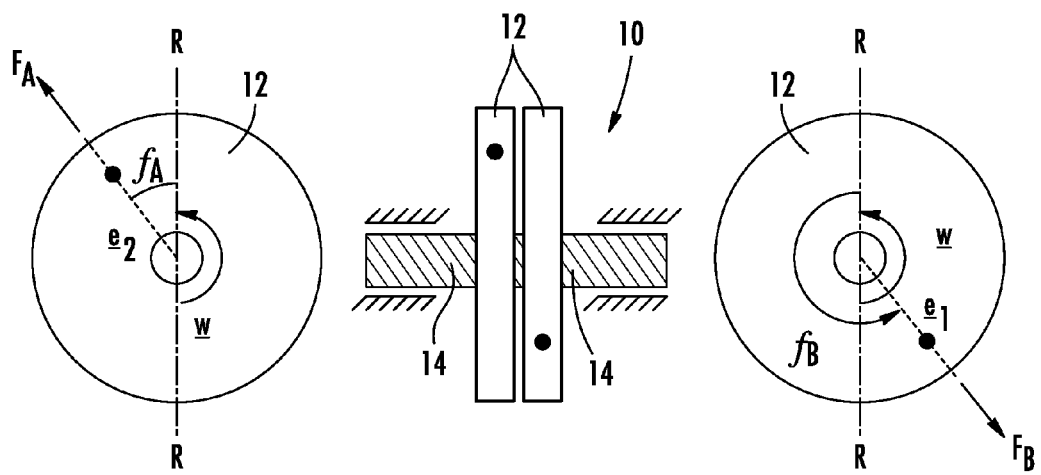
FIG. 2 illustrates a schematic of a split flywheel concept according to one embodiment of the present invention.

According to one embodiment of the present invention, FIG. 2 shows a basic schematic of a split flywheel assembly 10 including a plurality of flywheels 10 in operable engagement with one another rather than a single flywheel. Each flywheel 12 is driven by a respective motor 14 such that each flywheel can be spun independently of one another and at a respective speed (e.g., the same or different speeds). The split flywheel assembly 10 may include two separate, substantially geometrically identical flywheels 12 that are axially aligned with one another. The angles $f_A$ and $f_B$ measured with respect to the same reference axis "R" are hereafter referred to as the phases of flywheels A and B, respectively. The phases are the measures of the angle between the axis of eccentricity vector "$F_A$" or "$F_B$" and the reference axis "R". The imbalance force in one flywheel 12 is minimized by the imbalance force in the other when the phase difference between them ($f_B-f_A$) is altered. The phase difference may be altered by controlling one flywheel 12 independently of the other initially and then spinning them at substantially the same speed once the phase is altered so that the phase difference remains constant. The jitter may not be completely eliminated because of the difference in the locations of center of mass of the flywheels.

A flywheel assembly 20 according to one embodiment is shown in FIGS. 5-9. The overall mass and inertia of the flywheels 22 (flywheels A and B) are designed to be equivalent to that of the single flywheel. So, in the case of a pyramidal CMG system (see e.g., FIG. 3), four flywheels are replaced by a system with four pairs of flywheels. The flywheel assembly 20 may include an interface 23 for mounting on a gimbal for use in connection with a CMG as discussed above.

Figure 7:
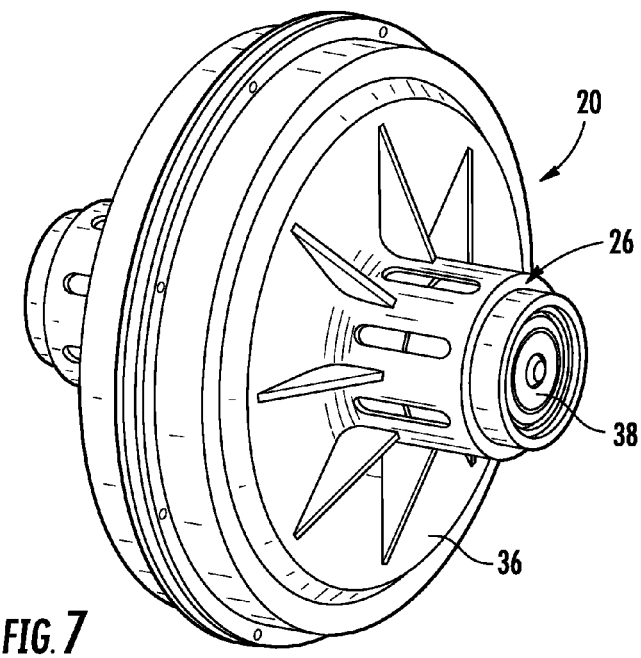
FIG. 7 shows a perspective view of a split flywheel assembly according to one embodiment of the present invention.

A pair of flywheels 22 are coupled to one another with a coupling member disposed therebetween, such as a central yoke 24. The flywheels 22 may be substantially symmetrically arranged about the central yoke 24. As shown in FIGS. 7-9, the flywheels 22 and central yoke 24 may be substantially circular in cross section and in axial alignment with one another. These flywheels 22 are spun (or capable of being spun) using two separate motors 26, each one substantially identical and powerful enough to spin both flywheels together or independently. The motors 26 include a casing 36 that is configured to receive a respective flywheel 22 so as to house the flywheels therein. The casings 36 for each of the motors 26 are substantially symmetric with respect to the central yoke 24. In one aspect, the motors 26 are frameless brushless DC motors. The use of frameless DC motors allows the use of common housing and common bearings for mounting both the motor and the load (flywheel), which saves a considerable amount of mass and volume. The frameless DC motor comprises a magnetic rotor 28 which is mounted on the flywheel shaft 32 and a stator 30 with windings mounted rigidly to the casing 36. The casings 36 are also configured to house the rotors 28 and stators 30 therein. The flywheels 22 are surrounded and supported by ball bearings 34 (e.g., ceramic bearings) and may be axially locked by spacers 38 and the casing 36. The motors 26 may also include bearings 34 for facilitating rotation of the motors with respect to the casing 36.

According to one embodiment, a clutch 40 is employed to engage and disengage the flywheels 22 with respect to one another. For example, the clutch 40 may be an electromagnetic friction clutch mounted within a cavity created by central recesses 42 defined between the flywheels 22. The clutch 40 may be cylindrical in configuration with an opening 43 defined therethrough. The central yoke 24 mounted between the two flywheels 22 is configured to receive and house the coils 44 of the electromagnetic clutch 40. The magnet 46 of the clutch 40 is mounted on a sleeve 48 with internal splines slidably disposed on the shaft 54 of flywheel A which has mating external splines (see FIG. 9). This assembly is configured to be positioned within the opening 43 defined through the coils 44. The friction plate 50 of the clutch 40 is mounted on the external face of the sleeve 48 which is configured to come in direct contact with the friction surface of flywheel B when the clutch is engaged (see FIG. 6A). Thus, the friction plate 50 may be mounted on the end of the sleeve 48 and/or include internal splines that correspond to the internal splines on the sleeve for engaging the shaft 54. The force for engaging the clutch 40 is provided by a helical spring 52 disposed about the shaft 54. To disengage the clutch 40, the coils 44 of the clutch are powered to move the sleeve 48 with the magnet 46 against the spring force such that the clutch disengages the friction surface of flywheel B (see FIG. 6B). In one embodiment, a controller may be utilized to control the operation of the clutch 40, wherein the controller may operate under control of a microprocessor or other similar processor. The controller that determines the control action for adjusting the flywheel speeds to alter the phase difference may also send control signals to engage or disengage the clutch.

The flywheels 22 are typically coupled together by the clutch 40 except when one of the flywheels is controlled to alter the phase difference between the flywheels to minimize imbalance and hence the jitter. Thus, when the clutch 40 is engaged, the flywheels 22 are able to be spun concurrently with one or more motors 26. The clutch 40 is disengaged to alter the phase difference between the flywheels 22. Once the phase has been altered to achieve a desired phase difference, the clutch 40 is again engaged and one of the motors 26 can be turned off with the other now driving the coupled flywheels 22. In some embodiments, the flywheel assembly 20 may add about 12-15% mass in comparison to a single flywheel assembly, but the mass tradeoff may be justified when the advantages of the split flywheel design are considered. In other embodiments, the mass and inertia of the split flywheel assembly 20 may be substantially the same as a single flywheel assembly used in an identical satellite. The split flywheel assembly 20 provides a redundancy in case of electrical failure of one of the motors 26 in addition to helping minimize the magnitude of attitude jitter. In addition, the flywheel assembly 10 allows the rotation of the flywheels 22 even in an event of failure of one of the motors 26 as the two flywheels are coupled together by the clutch 40 and can be driven only by the active motor. Thereby there is no compromise on the net angular momentum.

Figure 5:
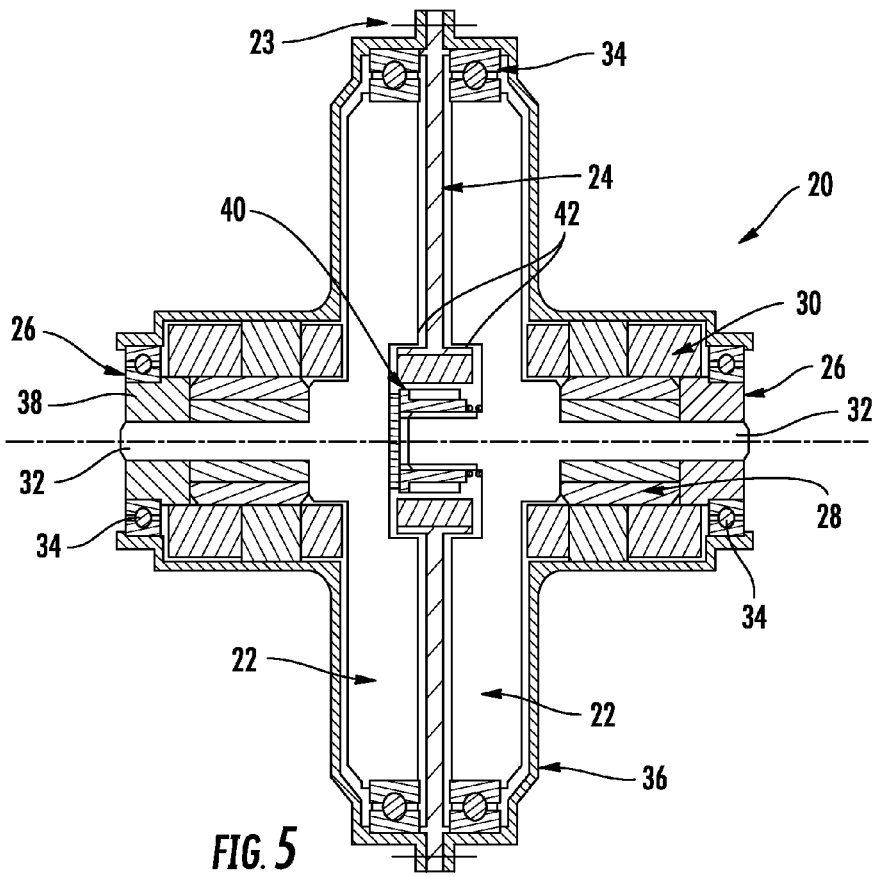
FIG. 5 illustrates a cross-sectional view of a split flywheel assembly according to an embodiment of the present invention.
Figures 6A, 6B:
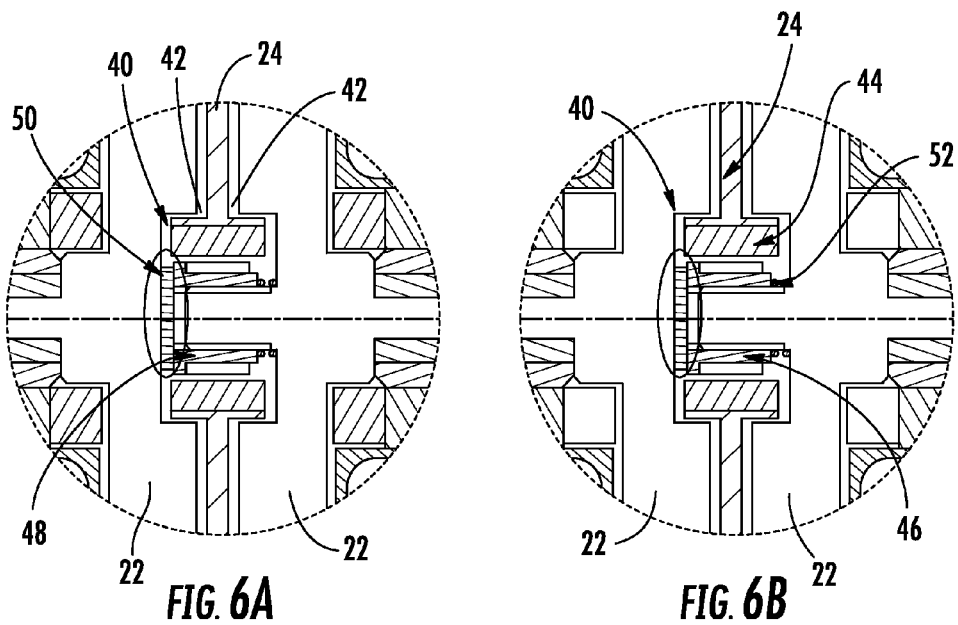
FIGS. 6a-b show enlarged perspective views of a clutch engaging and disengaging the flywheels according to one embodiment of the present invention.

In one embodiment, a method for minimizing the amplitude of attitude jitter is provided. Initially, the split flywheel assembly 20, such as that shown in FIG. 5, is assumed to be in equal phase ($f_B-f_A=0$) and spinning at substantially the same velocity. This would cause maximum jitter, and the goal is to reach a desired phase difference of p ($f_B-f_A=p$) which would cause minimum imbalance and jitter. To achieve this goal, the clutch 40 is first disengaged and the two flywheels 22 are independently spun by their respective motors 26 at equal speed. Then one of the flywheel motors 26 may be controlled by incrementing and decrementing the speed (thereby altering the phase difference) until the jitter becomes minimized which corresponds to a phase difference of p radians. The feedback of the jitter may be obtained from an inertial measurement unit on board the satellite which can measure the angular rate of the satellite. Once the desired magnitude of jitter is achieved, the flywheels 22 are spun at substantially the same speed maintaining a constant phase difference. Then the clutch 40 is engaged and one of the motors 26 is turned off simultaneously. This operation is preferably performed simultaneously as it may cause the clutch 40 to slip because of the possibility of difference in the control commands to the motor 26 at any instant of time.

Attitude Dynamics of a Satellite with a Split Flywheel Assembly

Nomenclature:

C=Center of mass of satellite $\underline{e}^A, \underline{e}^B$=Position vectors of point mass $m_A$ and $m_B$ w.r.t point $O_A$ and $O_B$ respectively $\underline{H}_c^A, \underline{H}_c^B$=Angular momentum of flywheels A and B about C $\underline{H}_c^{cu}$=Angular momentum of the satellite about C $\underline{I}_{O_A}^A, \underline{I}_{O_B}^B$=Moment of inertia of flywheels A and B about points $O_A$ and $O_B$ respectively $\underline{I}_c^{cu}$=Moment of inertia of the satellite about C $m_i, M_i$=Mass of particle i, Mass of rigid body i $\underline{r}^A, \underline{r}^B$=Position vectors of points $O_A$ and $O_B$ w.r.t C $\underline{\tau}$=Torque $\hat{u}$=Unit vector u $\underline{v}^A, \underline{v}^B$=Linear velocity of point masses $m_A$ and $m_B$ $^F\underline{v}^B$=Vector v of body B coordinatized if frame F $\underline{v}^\times$=Skew matrix operation equivalent to cross product $$\underline{v}^\times = \begin{bmatrix} 0 & -v_3 & v_2 \\ v_3 & 0 & -v_1 \\ v_2 & v_1 & 0 \end{bmatrix}$$

Figure 10:
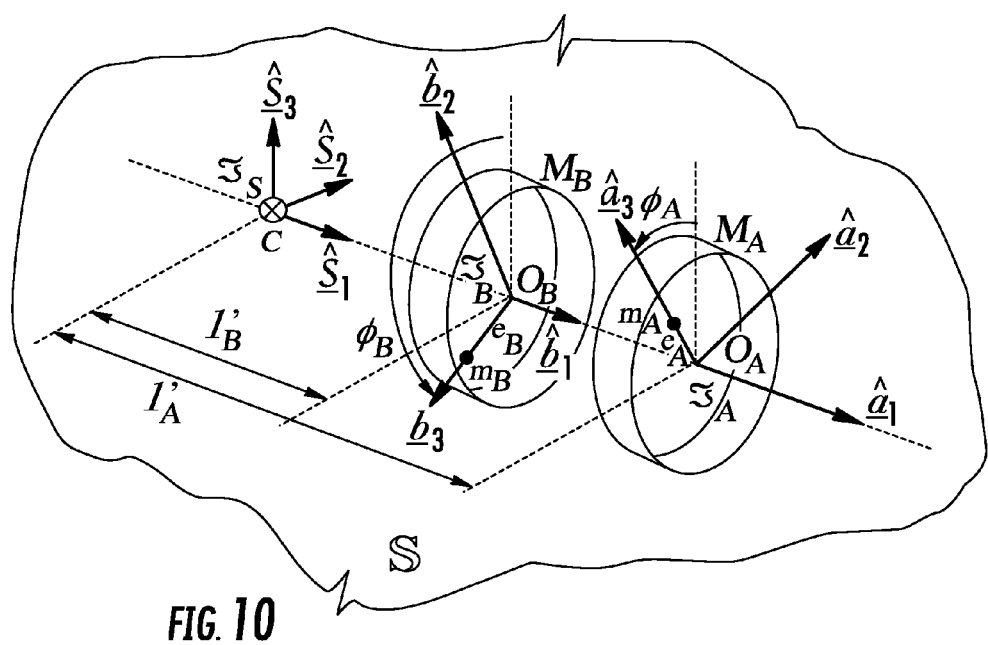
FIG. 10 illustrates exemplary variables for assessing the dynamics of a satellite with a split flywheel assembly according to one embodiment of the present invention.

$v_i$=Scalar component of vector $\underline{v}^i$ $\underline{\omega}^A, \underline{\omega}^B$=Angular velocity of flywheels A and B $\underline{\omega}^S$=Angular velocity of satellite $\underline{\dot{\omega}}^A, \underline{\dot{\omega}}^B$=Angular acceleration of flywheels A and B $\underline{\dot{\omega}}^S$=Angular acceleration of satellite $f_A, y_B$=Phase angles The following discussion formulates the dynamics of a satellite [1]. The satellite S is assumed to be rigid with split flywheels. FIG. 10 shows a representation of various elements involved in the formulation. C is the satellite centre of mass and $\Im_S$ is the coordinate frame $\Im_S$ fixed to the satellite. Flywheels A and B rotate about their respective geometric centers $O_A$ and $O_B$. $\Im_A$ and $\Im_B$ are the coordinate frames attached to flywheels A and B respectively. The $i^{th}$ flywheel with geometric centre X with is modeled as a composition of a homogeneous disc of mass $M_i$, and inertia $\underline{I}_X^i$ and a point mass $m_i$ at a distance $\underline{e}^i$ from X. The geometric centers $O_A$ and $O_B$ of the flywheels are located at distances $\underline{r}^A$ and $\underline{r}^B$ respectively from C. The flywheels are assumed to rotate about the positives $\hat{s}_1$ axis. Based on the definition of phase above, the phase of flywheels A and $$B = \phi_A = \cos^{-1}\left(\frac{e^A \cdot \hat{s}_z}{e_A}\right) \text{ and } \phi_B = \cos^{-1}\left(\frac{e^B \cdot \hat{s}_z}{e_B}\right)$$

respectively. The phase difference between the flywheels is $(\phi_A - \phi_B)$.

In focusing on the attitude jitter, only the rotational dynamics of the satellite are considered below. Furthermore, the equations of motion are all coordinatized in the satellite frame $\Im_S$, thus, the left superscript denoting the frame of coordinatization is neglected in the development set forth below.

The total angular momentum of the satellite about C is:

$$\underline{H}_c^S = \underline{H}_c^{cu} + \underline{H}_c^A + \underline{H}_c^B \tag{1}$$

where $\underline{H}_c^{cu}$ is the angular momentum of the satellite structure about C, $\underline{H}_c^A$ and $\underline{H}_c^B$ are the angular momentum of flywheels A and B, respectively.

Assuming there is no external torque acting on the satellite ($\underline{\tau}=\underline{0}$) Euler's law reduces to:

$$\frac{d}{dt}(H_c^{cu}) + \frac{d}{dt}(H_c^A) + \frac{d}{dt}(H_c^B) = \underline{0} \tag{2}$$

Angular momentum of the satellite structure, $$\underline{H}_c^{cu} = \underline{I}_c^{cu} \underline{\omega}^S$$

Assuming the inertia matrix $\underline{I}_c^{cu}$ to be diagonal and constant, $$\frac{d}{dt}(H_c^{cu}) = \underline{I}_c^{cu} \underline{\dot{\omega}}^S \tag{3}$$

The angular momentum of flywheel A about C=$\underline{H}_c^A$ $$\underline{H}_c^A = \underline{H}_{O_A}^A + M_A([\underline{r}^A]^\times \underline{v}^{O_A}) + m_A[\underline{r}^A + \underline{e}^A]^\times \underline{v}^A$$

$$\underline{v}^A = [\underline{\omega}^S]^\times \underline{r}^A + [\underline{\omega}^S + \underline{\omega}^A]^\times \underline{e}^A = \underline{H}_{O_A}^A + M_A([\underline{r}^A]^\times [\underline{\omega}^S]^\times \underline{r}^A) + m_A([\underline{r}^A + \underline{e}^A]^\times ([\underline{\omega}^S]^\times \underline{r}^A + [\underline{\omega}^S + \underline{\omega}^A]^\times \underline{e}^A))$$

$$\underline{H}_{O_A}^A = \underline{I}_{O_A}^A \underline{\omega}_A$$

$$\underline{H}_c^A = \underline{I}_{O_A}^A \underline{\omega}^A + M_A([\underline{r}^A]^\times [\underline{\omega}^S]^\times \underline{r}^A) + m_A([\underline{r}^A + \underline{e}^A]^\times ([\underline{\omega}^S]^\times \underline{r}^A + [\underline{\omega}^S + \underline{\omega}^A]^\times \underline{e}_A)) \tag{4}$$

Where, $$\underline{e}^A + [0 - e_A \sin \phi_A e_A \cos \phi_A]^T \underline{r}^A = [r_A 0 0]^T$$

$$\underline{\omega}^A = [\omega_A 0 0]^T.$$

The total time rate of change of $\underline{H}_c^A$ yields:

$$\frac{d}{dt}(H_c^A) = \underline{I}_{O_A}^A \underline{\dot{\omega}}^A + [\omega^S]^\times \left(\underline{I}_{O_A}^A \underline{\omega}^A\right) + M_A\left[([\underline{r}^A]^\times [\underline{\dot{\omega}}^S]^\times \underline{r}^A) - [\omega^S]^\times (\underline{r}^A([\underline{r}^A]^T \underline{\omega}^S))\right] + m_A\begin{bmatrix} [\underline{r}^A + \underline{e}^A]^\times \begin{Bmatrix} [\underline{\dot{\omega}}^S]^\times \underline{r}^A + \\ [\underline{\dot{\omega}}^S + \underline{\dot{\omega}}^A]^\times \underline{e}^A + [\omega^S + \omega^A]^\times \underline{\dot{e}}^A \end{Bmatrix} + \\ [\underline{\dot{e}}^A]^\times \{[\omega^S]^\times \underline{r}^A + [\omega^S + \omega^A]^\times \underline{e}^A\} \end{bmatrix}. \tag{5}$$

Similarly for flywheel B, $$\underline{H}_c^B = \underline{I}_{O_B}^B \underline{\omega}^B + M_B[[\underline{r}^B]^\times [\underline{\omega}^S]^\times \underline{r}^B] + m_B([\underline{r}^B + \underline{e}^B]^\times ([\underline{\omega}^S]^\times \underline{r}^B + [\underline{\omega}^S + \underline{\omega}^B]^\times \underline{e}^B)) \tag{6}$$

Where, $$\underline{e}^B = [0 - e_B \sin \phi_B e_B \cos \phi_B]^T \underline{r}^B = [r_B 0 0]^T$$

$$\underline{\omega}^B = [\omega_B 0 0]^T.$$

The total time rate of change of $\underline{H}_c^B$ yields:

$$\frac{d}{dt}(H_c^B) = \underline{I}_{O_B}^B \underline{\dot{\omega}}^B + [\omega^S]^\times \left(\underline{I}_{O_B}^B \underline{\omega}^B\right) + M_B\begin{bmatrix} ([\underline{r}^B]^\times [\underline{\dot{\omega}}^S]^\times \underline{r}^B) - \\ [\omega^S]^\times (\underline{r}^B([\underline{r}^B]^T \underline{\omega}^S)) \end{bmatrix} + \tag{7}$$

-continued $$m_B \begin{bmatrix} [\underline{r}^B + \underline{e}^B]^\times \{[\underline{\omega}^S]^\times \underline{r}^B + [\underline{\omega}^S + \underline{\omega}^B]^\times \underline{e}^B + [\underline{\omega}^S + \underline{\omega}^B]^\times \underline{\dot{e}}^B\} + \\ [\underline{\dot{e}}^B]^\times \{[\underline{\omega}^S]^\times \underline{r}^B + [\underline{\omega}^S + \underline{\omega}^B]^\times \underline{e}^B\} \end{bmatrix}.$$

Substituting equations (3), (5), and (7) in (2):

$$\underline{\dot{\omega}}^S = -(\underline{I}_c^{cu})^{-1}\left(\frac{d}{dt}(H_c^A) + \frac{d}{dt}(H_c^B)\right) \qquad (8)$$

Equation (8) gives us three equations for the rotational motion of the satellite.

Simulation and Results

Exemplary experimental simulations were performed using equation (8) in Matlab® for four different cases of mass, eccentricities, phase difference, and axial separation of the flywheels. Since the eccentricity is in the plane containing $\hat{\underline{s}}_2$ and $\hat{\underline{s}}_3$ of $\mathfrak{I}_S$, the jitter can be observed about the $\hat{\underline{s}}_2$ and $\hat{\underline{s}}_3$ axes. Also, since the inertias of the satellite about these axes are identical, the jitter profiles are similar and jitter about the $\hat{\underline{s}}_2$ axis is considered below for inference of behavior of jitter.

Case 1:

$$\underline{I}_c^{cu} = \begin{bmatrix} 1.7E^{-3} & 0 & 0 \\ 0 & 1.7E^{-3} & 0 \\ 0 & 0 & 1.7E^{-3} \end{bmatrix} \text{Kgm}^2$$

$$\underline{I}_{O_A}^A = \underline{I}_{O_B}^B = \begin{bmatrix} 0.85E^{-6} & 0 & 0 \\ 0 & 0.5E^{-6} & 0 \\ 0 & 0 & 0.5E^{-6} \end{bmatrix} \text{Kgm}^2$$

$M_A = M_B = 0.025$ Kg $m_A = m_B = 0.001$ Kg $e_A = e_B = 0.0001$ m $\underline{r}^A = [\,0.035 \quad 0 \quad 0\,]^T$ m $\underline{r}^B = [\,0.03 \quad 0 \quad 0\,]^T$ m $\phi_B - \phi_A = 0$ $\omega^A = \omega^B = 523$ rad/s Case 2:

The parameters are the same as in case 1 except $e_B = 0.001$ m

Case 3:

The parameters are the same as in case 1 except $\underline{r}^A = [0.045\ 0\ 0]^T$ m Case 4:

The parameters are the same as in case 1 except $\phi_B - \phi_A = \pi$

Figure 11:
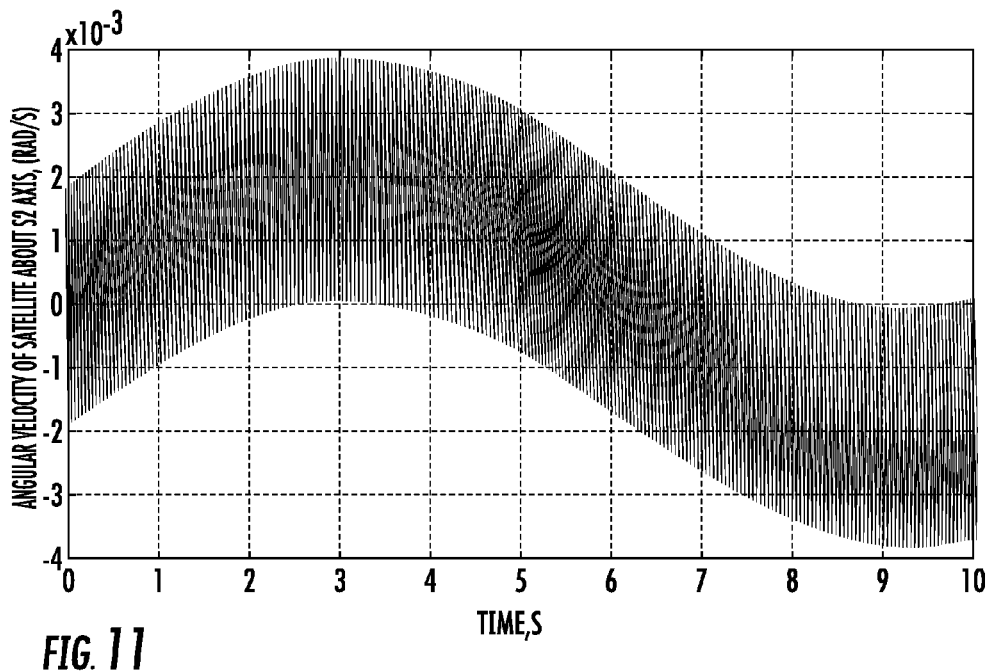
FIGS. 11-19 show various simulation results of a split flywheel assembly according to one embodiment of the present invention.

FIGS. 11-15 show the plots of the angular velocity of the satellite about the $\hat{\underline{s}}_2$ axis for each of the above cases. FIG. 11 is the plot of the jitter about the $\hat{\underline{s}}_2$ axis simulated for a period of 10 seconds and shows the low frequency and high frequency components of the jitter.

Figure 12:
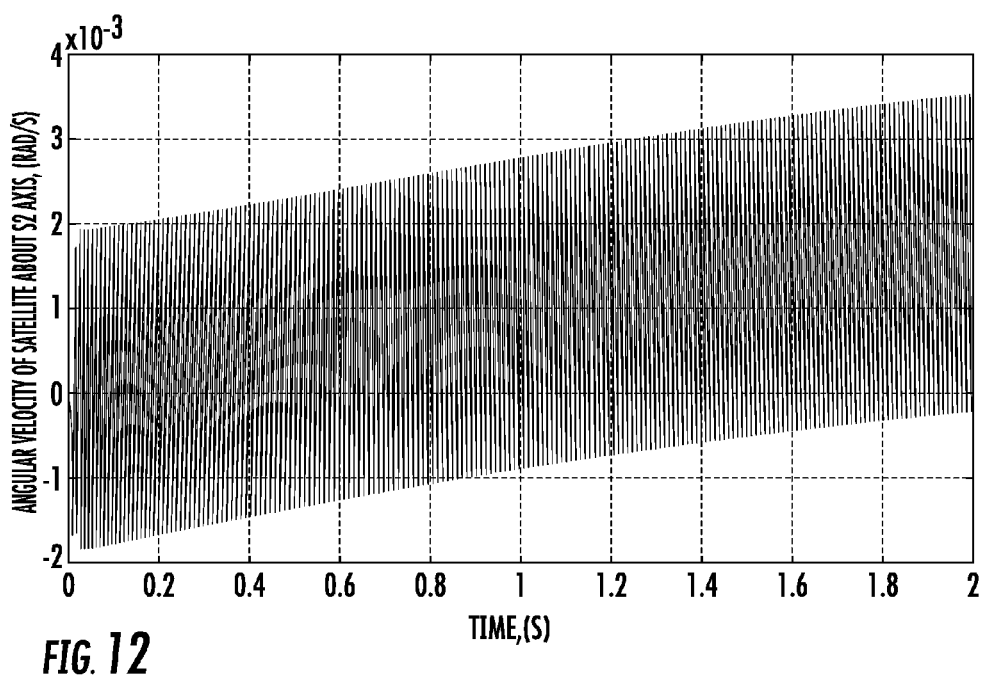

FIG. 12 is the same as FIG. 11 but is shown for a 2 second interval for better clarity of the high frequency component. FIGS. 12-15 have also been plotted for the 2 second interval for the same reason.

Figure 13:
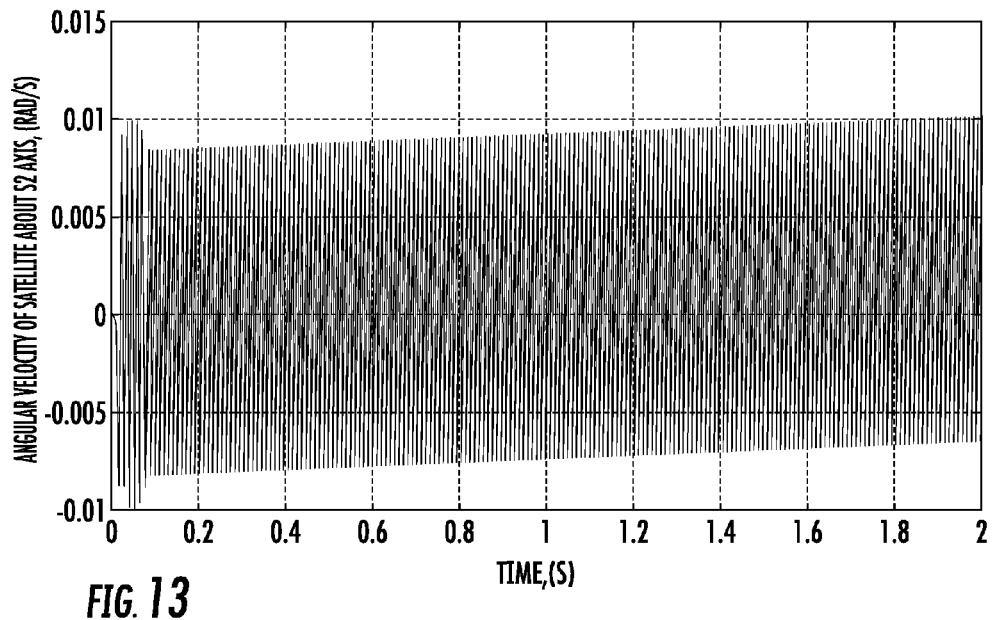

FIG. 13 is a plot of the jitter for case 2, and comparing it with FIG. 12, it can be inferred that the magnitude of jitter increases with increase in the eccentricity.

Figure 14:
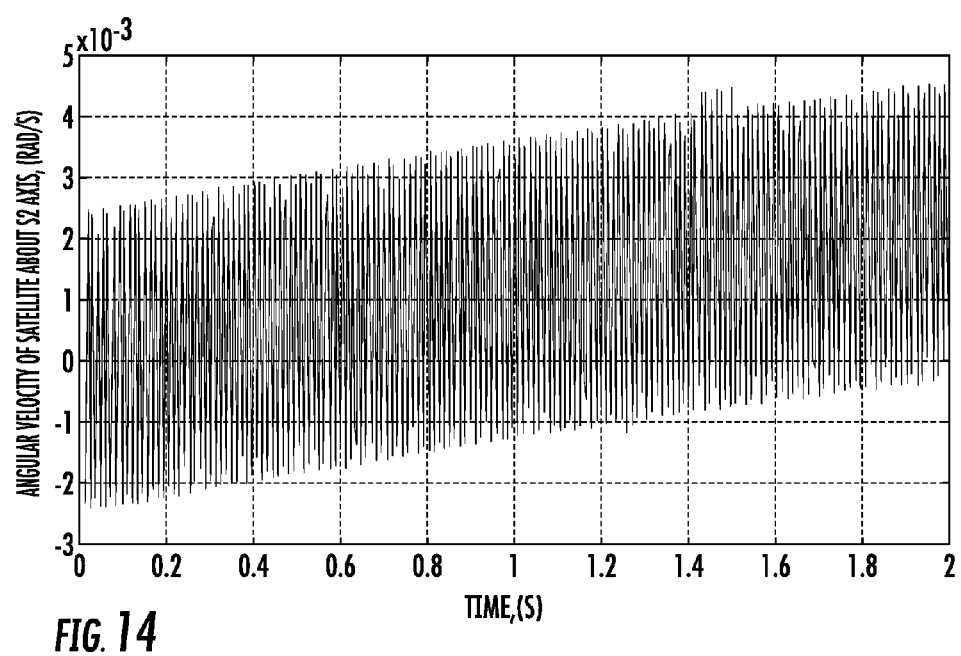

FIG. 14 shows the plot of jitter for case 3, and comparing it with FIG. 12, it can be inferred that the magnitude of jitter increases with increase in the axial separation of the flywheels.

Figure 15:
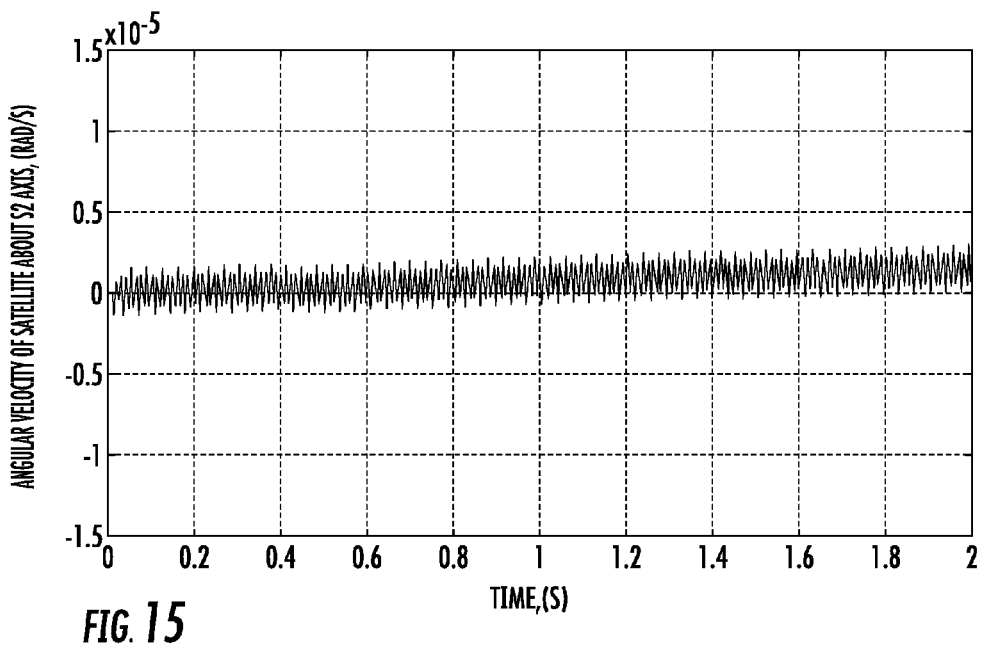

It can be also be deduced from FIG. 15 for case 4 that the magnitude of jitter can be minimized by changing the phase difference between the flywheel and in the particular case considered, the magnitude of jitter is minimum as the phase difference is $\phi_B - \phi_A = \pi$.

Figure 16:
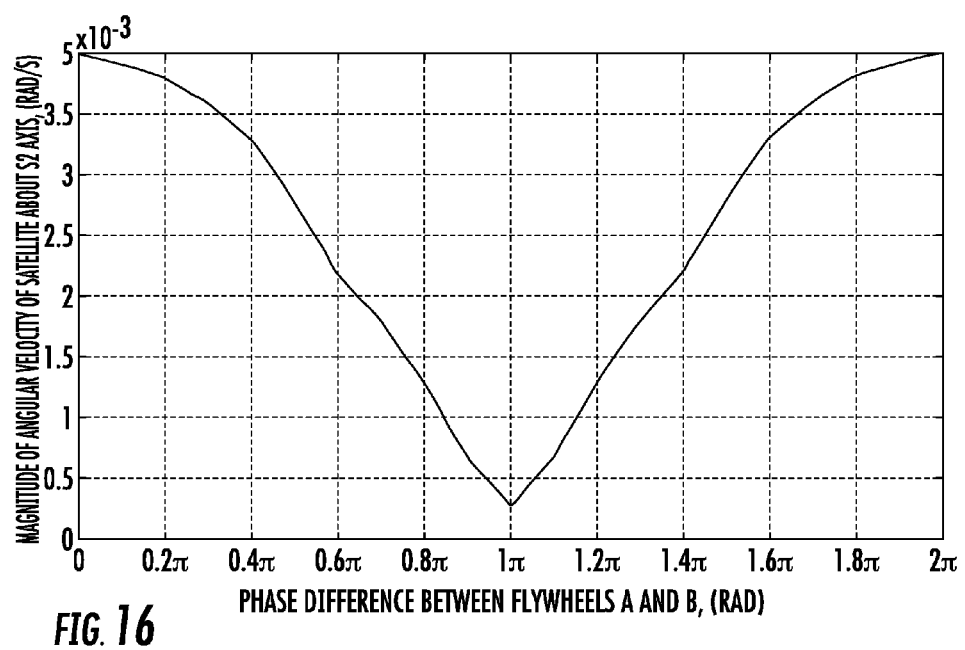

FIG. 16 illustrates the variation in the magnitude of jitter (computed as the difference between the maximum and minimum values of jitter for one cycle corresponding to the simulation parameters in case 1 for values of $\phi_B - \phi_A$ ranging from 0 to $2\pi$. It is clear from FIG. 15 that the jitter reduces to a minimum for a phase difference of $\pi$ radians.

Figure 19:
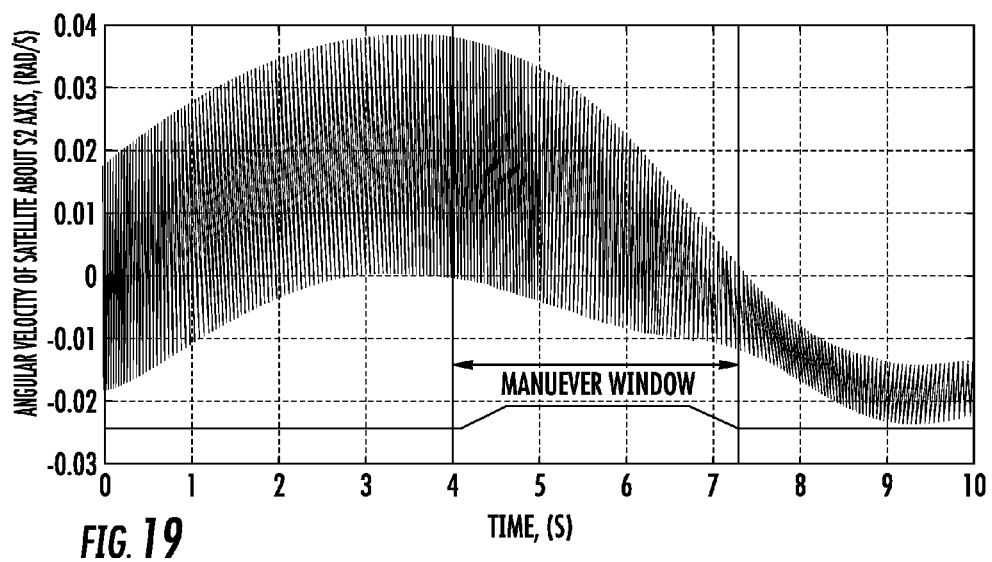

The phase difference can be changed in real time when the flywheels are spinning at their operational speed or at a much lower speed where the control could be faster. Since $\phi_A$ and $\phi_B$ are controlled by two different motors, their difference can be altered. A simple trapezoidal velocity command like the one shown in FIG. 17 can be used to increment the speed of one of the flywheels and hence change the phase difference between the flywheels. FIG. 19 shows the plot of the angular velocity of the satellite in response to a velocity command similar to FIG. 17 to change the phase difference between the flywheels from 0 to $\pi$ radians. It can be seen that there is still a residual torque that is present even after phase control which is due to the difference in the distances of the center of mass of the flywheels from the spacecraft center of mass. The jitter can be further minimized by designing the flywheel farther from the spacecraft center with lesser mass or the closer one with higher mass as the magnitude of jitter varies directly with the imbalance mass and its distance from the spacecraft center of mass.

Figure 17:
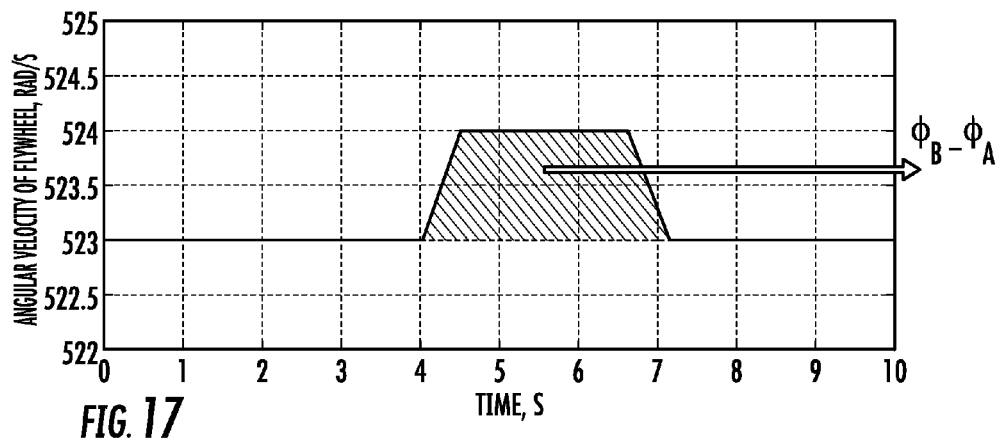
Figure 18:
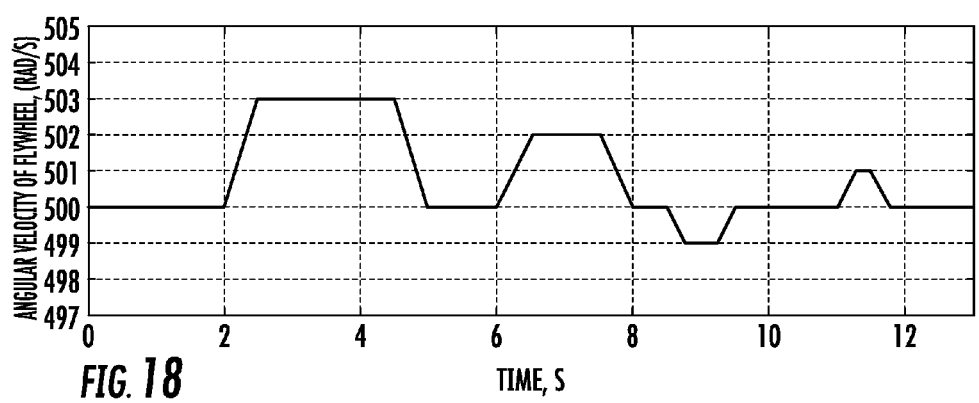

The velocity command in FIG. 17 requires a feedback of the phase of the flywheel which cannot be measured. The magnitude of jitter, which can be measured, is directly related to the phase difference between the flywheels and can be used as a feedback element. Several trapezoidal velocity commands (see e.g., FIG. 18) can be used to increment and decrement the speed of the controlled flywheel consequently incrementing and decrementing the phase difference until the feedback jitter value reaches a minimum or a threshold value. FIG. 17 shows a velocity command to the flywheel to change its phase. FIG. 19 shows the plot of jitter for parameters same as in case 1 when the phase difference is changed gradually from 0 to $\pi$ through a velocity command shown in FIG. 17.

Therefore, embodiments of the present invention may provide several advantages. Attitude jitter is a hindrance on spacecrafts requiring high pointing accuracy and stability. It can be deduced from the aforementioned discussion that attitude jitter due to flywheel imbalance can be minimized significantly by controlling the phase difference between the flywheels. It is evident that the split flywheel assembly may have many advantages according to various embodiments—redundancy, increased life of motor, and attitude jitter minimization. The frequency of jitter can be minimized to complement this system by using dampers. Preliminary results are promising and are indicative of application to real systems.

Many modifications and other embodiments of the inventions set forth herein will come to mind to one skilled in the art to which these inventions pertain having the benefit of the teachings presented in the foregoing descriptions. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

REFERENCES

[1] Peter C. Hughes, Spacecraft Attitude Dynamics, Dover Publications, 2004 (ISBN 0486439259).
[2] Marcelo C. Algrain and Richard M. Powers, "High-bandwidth measurements of attitude jitter in small spacecraft", *Guidance, Navigation and Control Conference*, San Diego, Calif., Jul. 29-31, 1996.
[3] E. Burrough and A. Lee, "Pointing Stability Performance of the Cassini Spacecraft", *AIAA Guidance, Navigation and Control Conference and Exhibit*, Honolulu, Hi., Aug. 18-21, 2008.
[4] Fuh-Wen Shiue, George A. Lesieutre, and Charles E. Bakis, "Condition monitoring and virtual containment for composite flywheels", *Structures, Structural Dynamics, and Materials Conference and Exhibit*, 42nd, Seattle, Wash., Apr. 16-19, 2001.
[5] J. E. McIntyre and M. J. Gianelli, "Bearing Axis Wobble for a Dual Spin Vehicle", Journal of Spacecrafts and Rockets, Vol. 8, No. 9, September 1971.

That which is claimed:

1. A split flywheel assembly for minimizing the amplitude of attitude jitter, the split flywheel assembly comprising:
at least two independent concentric flywheels axially aligned and in operable engagement with one another such that each flywheel is configured to be independently controlled in order to manipulate a phase difference therebetween;
at least one coupling apparatus positioned between the flywheels and comprising at least one clutch, wherein the clutch is configured to selectively engage at least one of the flywheels to couple the flywheels together to cause the flywheels to spin concurrently, wherein the clutch is further configured to selectively disengage at least one of the flywheels to decouple the flywheels to cause the flywheels to spin independently of one another in order to obtain a phase difference to balance the flywheel assembly to minimize the amplitude of attitude jitter;
a plurality of motors, wherein each motor is configured to spin a respective flywheel at a desired speed; and
a controller configured to monitor the jitter and operate, based on the jitter, at least one motor to obtain the phase difference between the flywheels to balance the flywheel assembly.

2. The split flywheel assembly of claim 1, wherein the flywheels are substantially geometrically identical.

3. The split flywheel assembly of claim 1, wherein the coupling apparatus comprises a central yoke, and wherein the flywheels are mounted substantially symmetrically on the central yoke.

4. The split flywheel assembly of claim 1, wherein the controller is further configured to control the clutch.

5. The split flywheel assembly of claim 1 wherein the clutch is an electromagnetic friction clutch.

6. The split flywheel assembly of claim 1, wherein the flywheels are substantially, geometrically identical and are mounted substantially symmetrically on a central yoke.

7. The split flywheel assembly of claim 1, wherein the motors are mounted in a common housing.

8. The split flywheel assembly of claim 1, wherein the motors are frameless brushless DC motors.

9. The split flywheel assembly of claim 1, wherein the overall mass and inertia of the flywheel assembly is about 12% to 15% greater than the overall mass and inertia of a single flywheel assembly capable of being used in an identical satellite.

10. The split flywheel assembly of claim 1, wherein the overall mass and inertia of the flywheel assembly is substantially the same as the overall mass and inertia of a single flywheel assembly capable of being used in an identical satellite.

11. The split flywheel assembly of claim 1, wherein a pair of independent flywheels are in operable engagement with one another.

12. The split flywheel assembly according to claim 1, wherein the assembly is configured to be mounted within a satellite such that the satellite can be rebalanced by independently controlling the speed of rotation of at least one of the flywheels to adjust the phase difference therebetween.

13. A method for minimizing the amplitude of attitude jitter, the method comprising:
providing at least two independent concentric flywheels axially aligned and in operable engagement with one another;
disengaging a clutch of at least one coupling apparatus from at least one of the flywheels to decouple the flywheels, wherein the clutch is positioned between the flywheels, wherein the clutch is configured to selectively engage at least one of the flywheels to couple the flywheels together to cause the flywheels to spin concurrently, wherein the clutch is further configured to selectively disengage at least one of the flywheels to decouple the flywheels to cause the flywheels to spin independently of one another;
monitoring the jitter; and
independently controlling, based on the jitter, a speed of rotation of at least one of the flywheels when the flywheels are decoupled to adjust a phase difference between the flywheels to balance the flywheel assembly to minimize the amplitude of attitude jitter.

14. The method according to claim 13, wherein controlling comprises incrementing and decrementing the speed of rotation of at least one of the flywheels.

15. The method of claim 14, wherein incrementing and decrementing the speed of rotation comprises providing one or more trapezoidal velocity commands.

16. The method according to claim 13, further comprising spinning the flywheels with respective motors at substantially the same speed at a determined phase difference.

17. The method according to claim 16, further comprising stopping rotation of one of the motors and spinning the flywheels concurrently with a single motor.

18. The method according to claim 17, wherein stopping rotation of one of the motors and spinning the flywheels concurrently occurs simultaneously.

19. The split flywheel assembly of claim 1, wherein the split flywheel assembly is configured such that a single motor of the plurality of motors is configured to spin the flywheels when the flywheels are coupled together and each motor of the plurality of motors is configured to spin a respective flywheel when the flywheels are decoupled.

* * * * *